United States Patent
Xi et al.

(10) Patent No.: US 10,629,938 B2
(45) Date of Patent: Apr. 21, 2020

(54) FUEL CELL END PLATE UNIT AND STACK

(71) Applicant: GM GLOBAL TECHNOLOGY OPERATIONS LLC, Detroit, MI (US)

(72) Inventors: Liang Xi, Northville, MI (US); Yeh-Hung Lai, Oakland, MI (US); Xi Yang, Bloomfield Hills, MI (US); Siguang Xu, Rochester Hills, MI (US); Jeffrey A Rock, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 115 days.

(21) Appl. No.: 15/436,696

(22) Filed: Feb. 17, 2017

(65) Prior Publication Data

US 2018/0241067 A1    Aug. 23, 2018

(51) Int. Cl.
| | | |
|---|---|---|
| *H01M 8/248* | (2016.01) | |
| *H01M 8/2404* | (2016.01) | |
| *H01M 8/02* | (2016.01) | |
| *H01M 8/1018* | (2016.01) | |

(52) U.S. Cl.
CPC ............. *H01M 8/248* (2013.01); *H01M 8/02* (2013.01); *H01M 8/2404* (2016.02); *H01M 2008/1095* (2013.01)

(58) Field of Classification Search
CPC ............................ H01M 8/248; H01M 8/2404
See application file for complete search history.

(56) References Cited

U.S. PATENT DOCUMENTS

| | | | |
|---|---|---|---|
| 4,615,107 A | 10/1986 | Kumeta et al. | |
| 6,022,634 A * | 2/2000 | Ramunni | C25B 9/04 429/463 |
| 6,689,503 B2 | 2/2004 | Yang et al. | |
| 2005/0095484 A1* | 5/2005 | Saulsbury | H01M 8/0247 429/457 |
| 2005/0095485 A1* | 5/2005 | Saulsbury | H01M 8/0206 429/430 |
| 2005/0158604 A1* | 7/2005 | Wariishi | H01M 8/247 429/467 |
| 2013/0089803 A1 | 4/2013 | Nielsen et al. | |
| 2015/0037706 A1* | 2/2015 | Fukuyama | H01M 8/02 429/468 |

FOREIGN PATENT DOCUMENTS

| | | |
|---|---|---|
| CA | 2383892 A1 | 1/2002 |
| WO | 2005045982 A2 | 5/2005 |

* cited by examiner

*Primary Examiner* — Lisa S Park
(74) *Attorney, Agent, or Firm* — Quinn IP Law (57) ABSTRACT

An end plate unit for use in a fuel cell stack in an electric vehicle is provided wherein the end plate includes an outer surface, an inner surface disposed opposite the outer surface and a current collector. The inner surface defines at least a first region and a second region which is spaced apart from and substantially parallel to the first region. The current collector may be affixed to the inner surface.

16 Claims, 8 Drawing Sheets

FIG. 1

(Prior Art)

FUEL CELL END PLATE UNIT AND STACK

TECHNICAL FIELD

The present disclosure relates to the compression of cell stacks and more specifically, to a force distributor for fuel cell stacks, in particular Proton Exchange Membrane (PEM) fuel cell stacks.

BACKGROUND

The following present disclosure is provided in relation to Proton Exchange Membrane (PEM) stacks. The force distributor according to the invention can however, also be used for other types of fuel cells such as SOFC fuel cell stacks. Molten Carbonate Fuel Cells (MCFC) or Direct Methanol Fuel Cells (DMFC). Further, the invention can also be used for electrolysis cells such as Solid Oxide Electrolysis Cells and such cell stacks. The electro-chemical reactions and the function of a fuel cell or an electrolysis cell is not the essence of the present invention, thus this will not be explained in detail, but considered known for a person skilled in the art.

Figure 1:
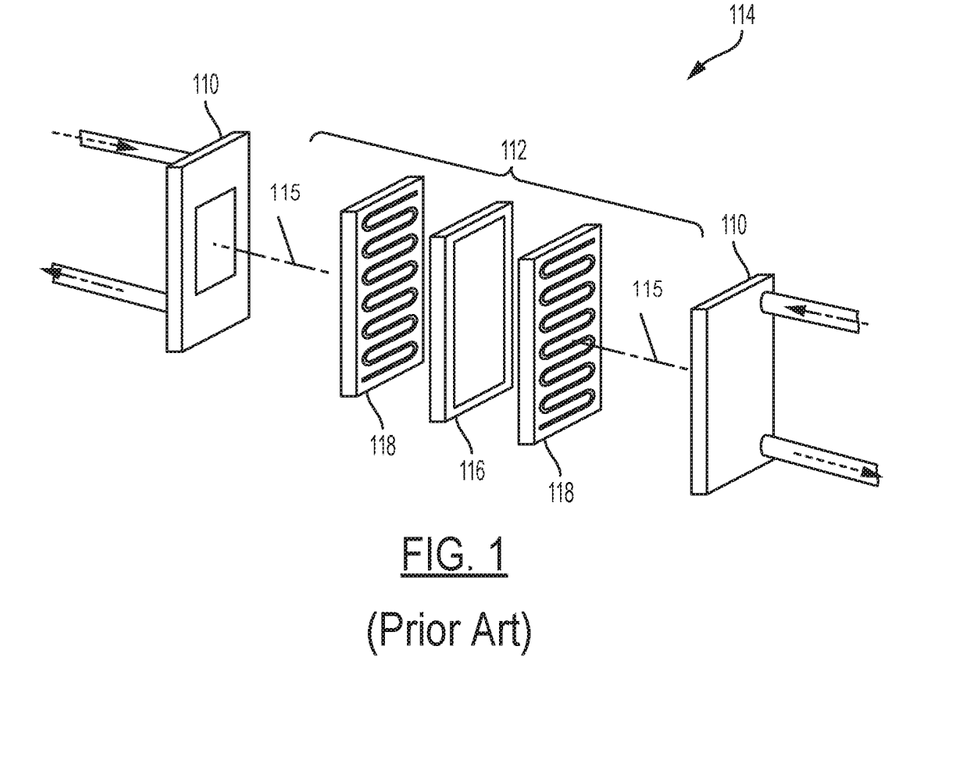
FIG. 1 is an expanded view of a traditional PEM fuel cell stack.

In a traditional fuel cell stack (as shown in FIG. 1), a plurality of fuel cell units 112 and traditional flat end plates 110 are assembled to form a stack 114. It is understood that a UEA 116 may be disposed between a pair of fuel cell plates (bipolar plates) thereby forming a fuel cell unit among the other similarly constructed fuel cell units schematically represented by phantom lines 115. The UEA 116 may include diffusion mediums (also known as a gas diffusion layer) disposed adjacent to an anode face and a cathode face of a membrane electrolyte assembly (MEA). The MEA includes a thin proton-conductive, polymeric, membrane-electrolyte having an anode electrode film formed on one face thereof, and a cathode electrode film formed on the opposite face thereof. In general, such membrane-electrolytes are made from ion-exchange resins, and typically comprise a perfluoronated sulfonic acid polymer such as NAFION™ available from the E.I. DuPont de Nemeours & Co. The anode and cathode films, on the other hand, typically comprise (1) finely divided carbon particles, very finely divided catalytic particles supported on the internal and external surfaces of the carbon particles, and proton conductive material (e.g., NAFION™) intermingled with the catalytic and carbon particles, or (2) catalytic particles, sans carbon, dispersed throughout a polytetrafluoroethylene (PTFE) binder.

The efficiency of the fuel cell stack 114 is dependent of small contact resistance between the various UEA's 116 and bipolar plates 118, and therefore it is crucial that a suitable compression force is applied to the fuel cell stack. This compression force must be large enough and evenly distributed throughout the area of the fuel cell stack 114 to ensure electrical contact, but not so large that it damages the electrolyte, the electrodes, the electrical interconnect or impedes the gas flow over the fuel cell. The compression of the fuel cell stack 114 is also vital for the seal between the layers of the stack to keep the stack gas tight. Further, different areas of the cell stack may require different compression forces, the electrochemical active (GDL—Gas Diffusion Layer) area of the cell stack 114 may require a higher compression force than the sealing areas (peripheral region of the bipolar plates). More importantly, the stack-up tolerance of the UEA's, bipolar plates and seals may change force distribution between the active area (GDL) area and seal area leading to compression force on the seal being either too high or too low. Hence, not only must the compression force be evenly distributed over some areas, there can also be a need to tailor the compression force such that a compression force of a first magnitude is evenly applied to some surface areas of the cell stack, but a compression force of a second, third and more magnitudes is evenly applied to other surface areas of the cell stack according to the specific compression requirements of the area in question.

A solution to this problem has been proposed in WO 2008089977 describing how the fuel cell stack has thermally insulating end blocks having one rectangular planar side facing the stack and an opposing side of convex shape. Springs tighten a flexible sheet against the convex shaped face of the end blocks, whereby the spring force is evenly distributed over the stack end areas.

In DE 10250345 a housing surrounding a SOFC is provided and a compressible mat between the stack and the housing provides a compression force to the cells both radially and axially.

WO 2005045982 describes how a multi-function end plate assembly may be used to preferentially compress a region of the fuel cell stack.

In WO 2008003286 a stack is compressed by thermally insulating elements, which are pressed against the stack by an elastic sleeve. The sleeve can for instance be made of silicone.

However, the aforementioned references are rather expensive to produce given the complexity of each design and the number of parts. Moreover, the aforementioned references disclose designs wherein uneven loads can still occur during operation and start/stop periods due to the changing conditions of especially temperature and pressure. Unevenness can lead to damage or performance reduction of the fuel cell stack.

Also, as is known, the traditional flat end plate 110 (shown in FIG. 1) cannot adjust forces of different magnitude to different areas of the cell stack end surface. Hence, the compression force cannot be tailored to the different requirements of different areas of the cell stack when the stack-up tolerance is involved.

Accordingly, there is a need to provide a robust fuel cell end plate design which redistributes the loads across the fuel cell stack in specific areas while at a reduced cost.

The above information disclosed in this Background section is only for enhancement of understanding of the background of the invention, and therefore, it may contain information that does not form the prior art that is already known in this country to a person of ordinary skill in the art. Accordingly, there is a need for an improved end plate unit for a fuel cell stack which better distributes compression loads across the fuel cell stack.

SUMMARY

The present disclosure provides for an improved end plate for use in a Proton Exchange Membrane (PEM) fuel cell stack. In a first embodiment of the end plate unit, the end plate unit includes an outer surface, an inner surface disposed opposite the outer surface and a current collector. The inner surface defines a first (planar) region and a second (planar) region which is spaced apart from and substantially parallel to the first (planar) region. The current collector may be affixed to the inner surface.

In a second embodiment of the present disclosure, the end plate unit includes an outer surface, an inner surface disposed opposite the outer surface, and a current collector affixed to the inner surface. The inner surface defines a seal (planar) region, a center (planar) region and an outer (planar) region. The current collector may be affixed to the center planar region. It is understood that, in the second embodiment the center (planar) region may be spaced apart from and substantially parallel to the seal planar region. Also, the outer (planar) region may be spaced apart from and substantially parallel to the seal planar region. The inner surface may be disposed opposite the outer surface.

It is further understood that the present disclosure provides a method for manufacturing a fuel cell stack assembly which includes the steps of: (1) providing a first end unit which has a flat or substantially flat inner surface; (2) assembling a plurality of fuel cells on top of the first end unit; (3) measuring a seal force/active area force across the first end unit and the plurality of fuel cells or an average active area height for each fuel cell in the plurality of fuel cells; (4) providing a second contoured end plate unit(s) from a set of contoured end plate units based upon the seal force/active area force or the average active area height; or replacing the first end unit with a contoured third end unit and providing a second contoured end plate unit(s) from a set of contoured end plate units based upon the seal force/active area force or the average active area height; and (5) compressing the plurality of fuel cells, the second contoured end plate unit together with one of the first end unit or the third end unit via a plurality of mechanical fasteners. It is understood that the third contoured end unit may also come from a set of contoured end plate units based upon the measured forces and heights.

The present disclosure and its particular features and advantages will become more apparent from the following detailed description considered with reference to the accompanying drawings.

BRIEF DESCRIPTION OF THE DRAWINGS

These and other features and advantages of the present disclosure will be apparent from the following detailed description, best mode, claims, and accompanying drawings in which:

Like reference numerals refer to like parts throughout the description of several views of the drawings.

DETAILED DESCRIPTION

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, un-recited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this present disclosure pertains.

The following detailed description is merely exemplary in nature and is not intended to limit the present disclosure or the application and uses of the present disclosure. Furthermore, there is no intention to be bound by any theory presented in the preceding background or the following detailed description.

Figure 2A:
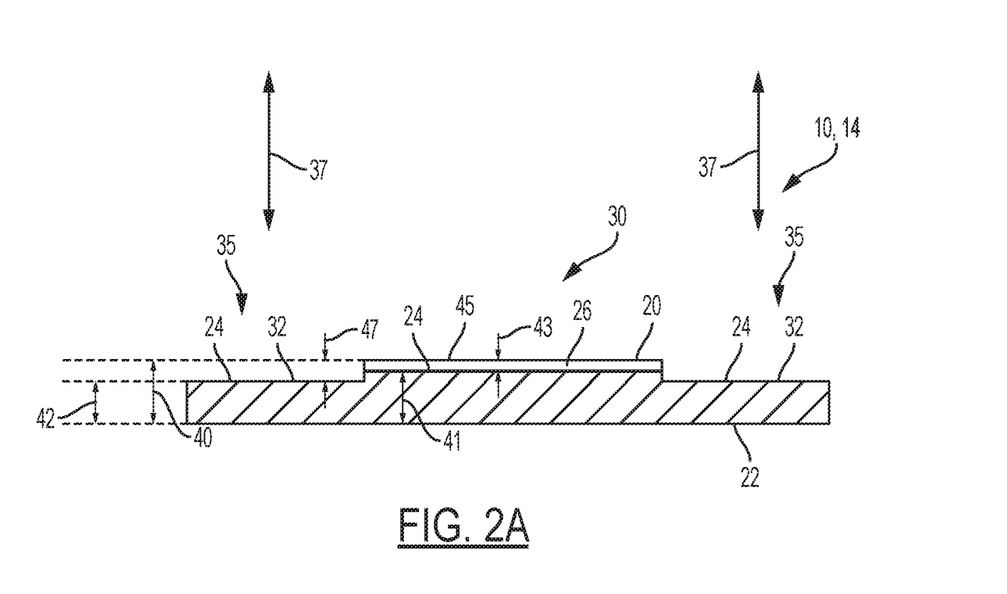
FIG. 2A is a schematic cross sectional view of the end plate unit in FIG. 2B along lines 2A-2A.
Figure 2B:
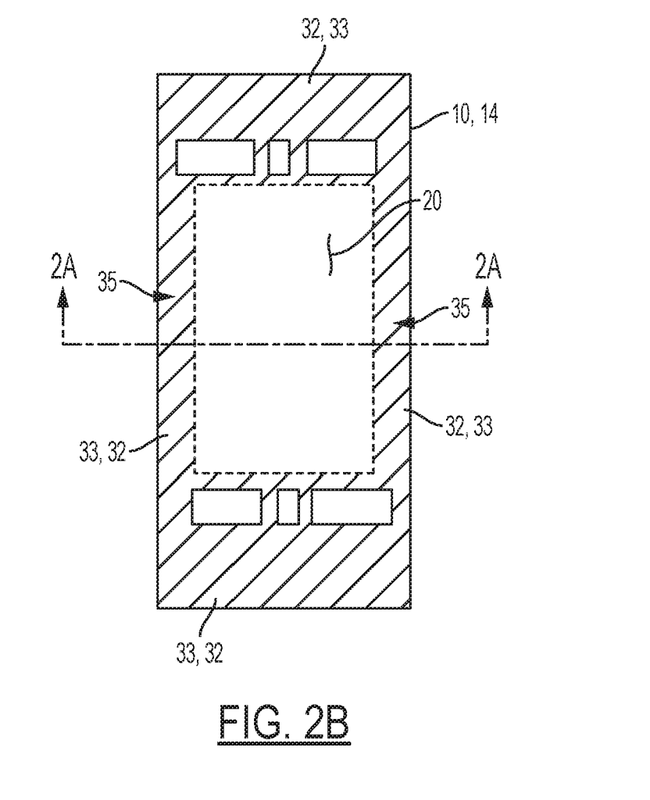
FIG. 2B is a schematic top view of a first embodiment end plate unit of the present disclosure.

The present disclosure provides for an end plate unit 10 for a fuel cell stack 80 (example shown in FIGS. 7A and 7B) which better distributes load force across the fuel cell stack. In accordance with a first embodiment and with reference to FIGS. 2A and 2B, an example end plate unit 10, 14 for a fuel cell stack is shown. FIG. 2B is a top schematic view which may represent the first embodiment while FIG. 2A illustrates the cross section of the end plate unit 10, 14 in FIG. 2B along lines 2-2. As shown in FIG. 2A, the end plate unit 10, 14 includes an outer surface 22, an inner surface 24 and a current collector 20. The inner surface 24 defines a first (planar) region 26 and a second (planar) region 32 spaced apart from and substantially parallel to the first (planar) region 26. It is understood that the inner surface 24 is disposed opposite the outer surface 22. The current collector 20, as shown, may be affixed to the inner surface 24. The current collector 20 is provided on the end plate unit 10, 14 so that the current collector 20 may collect current from a plurality of fuel cells 50 (shown in FIGS. 7A and 7B). As shown in FIGS. 2A and 2B, the first (planar) region 26 may be defined in the center area 30 of the end plate 10 and the second (planar) region 32 is defined in the outer area 33 of the end plate 10. It is understood that a current collector 20 may be affixed to the first (planar) region 26, and that the current collector 20 may, but not necessarily have a thickness of 2.0 mm to 8.0 mm. As shown in FIG. 2B, the first (planar) region 26 (with the current collector 20 affixed to it) is disposed in the center area 30 of the end plate 10. It is understood that, in all the embodiments of the present disclosure, the current collector 20 may be coupled to inner surface 24 via an optional shim (not shown) or the current collector 20 may be coupled to the inner surface 24 by directly affixing the current collector 20 to the inner surface 24. FIG. 2B also illustrates the second (planar) region 32 which is defined in the outer area 33 of the end plate 10. Referring back to FIG. 2A, the first and second planar regions 26, 32 may be substantially parallel to the outer surface 22 of the end plate unit 10, 14.

With reference to FIG. 2A, the first (planar) region 26 may be spaced apart from the outer surface 22 at a first thickness 41. The first thickness 41 may, but not necessarily fall in the range of about 8.0 mm to 25.0 mm. It is understood that a current collector having a second thickness 43 may be disposed on the first region 26. Accordingly, the top surface 45 of the current collector 20 when disposed on the first region 26 may be spaced apart from the outer surface at a first predetermined distance 40. It is understood that where an optional shim (not used) is used between the current collector 20 and the inner surface 24 in any of the embodiments of the present disclosure, the first predetermined distance 40, 40', 40", 40''' should be construed to include the thickness of a shim. The second (planar) region 32 is spaced apart from the outer surface 22 at a second predetermined distance 42. The height difference (H) 47 is defined as the difference in height between the first predetermined distance 40 and the second predetermined distance 42. It is understood that height difference H 47 may vary depending on the specific end plate unit used—given that the first predetermined distance and the second predetermined distance may each vary resulting in a different height difference H 47 for each plate in a set 90 of end plate units (shown in FIGS. 7A and 7B). H 47 may increase or decrease in increments as small as 0.50 mm from plate to plate within a set of end plate units in order to provide adequate options to an assembler or assembly system to resolve a load distribution issue. For example, as shown in FIG. 2A, height difference (H) 47 defines the distance upon which first region 26 and current collector 20 protrudes outward relative to the second region 32. In contrast, in FIG. 3A, height difference 47 defines the distance upon which the first region and current collector is recessed relative to the second region 32.

In the first embodiment shown in FIG. 2A, the first predetermined distance 40 is greater than the second predetermined distance. Accordingly, the end plate unit 10, 14 shown in FIG. 2A may be provide some margin or space in the seal area 35 upon assembly when it has been determined that the seal forces between the plurality of fuel cells and base end plate are too high and such seal forces need to be decreased upon final assembly—when the end plate unit 10, 14 is added and the fuel cell stack is compressed.

Figure 3A:
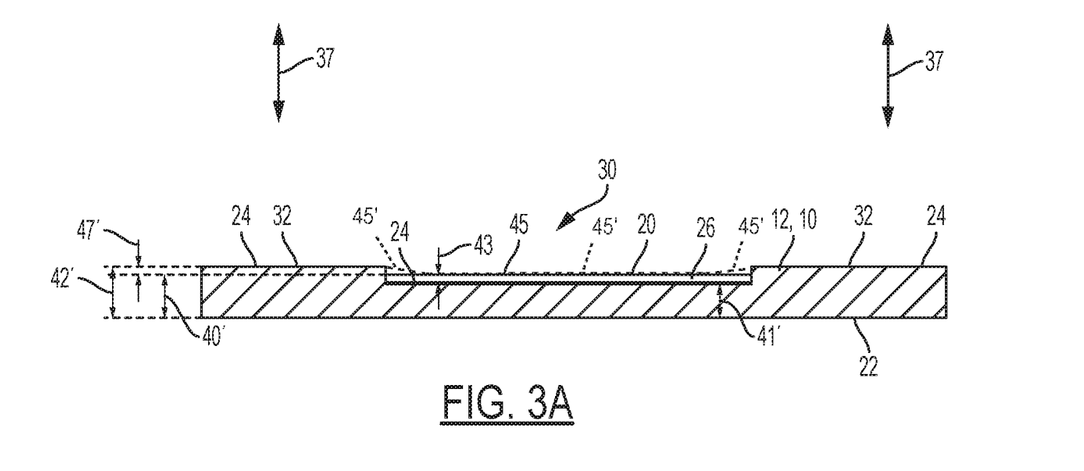
FIG. 3A is a schematic cross sectional view of the end plate unit in FIG. 3B along lines 3A-3A.
Figure 3B:
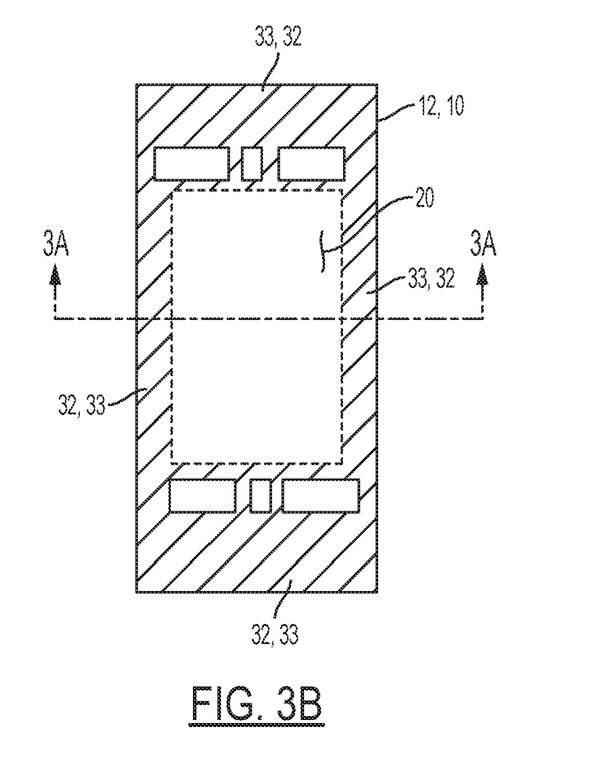
FIG. 3B is a schematic top view of second embodiment end plate unit of the present disclosure.

In accordance with a second embodiment and with reference to FIGS. 3A and 3B, another non-limiting example end plate unit 10, 12 for a fuel cell stack is shown. FIG. 3B is a top schematic view which may represent the second embodiment while FIG. 3A illustrates the cross section of the end plate unit 10, 12 in FIG. 3B along lines 3-3. As shown in FIG. 3A, the end plate unit 10, 12 includes an outer surface 22, an inner surface 24 and a current collector 20. The inner surface 24 defines a first (planar) region 26 and a second (planar) region 32 spaced apart from and substantially parallel to the first (planar) region 26. It is understood that the inner surface 24 is disposed opposite the outer surface 22. The current collector 20, as shown, may be affixed to the inner surface 24. Similar to the first embodiment, the current collector 20 may, but not necessarily have a thickness of 2.0 mm to 8.0 mm. The current collector 20 is provided on the end plate unit 10, 12 so that the current collector 20 may collect current from a plurality of fuel cells. As shown in FIGS. 3A and 33, the first (planar) region 26 may be defined in the center area 30 of the end plate and the second (planar) region 32 is defined in the outer area 33 of the end plate. It is understood that a current collector 20 may be affixed to the first (planar) region 26. As shown in FIG. 3B, the first (planar) region 26 (with the current collector 20 affixed to it) is disposed in the center area 30 of the end plate. FIG. 3B also illustrates the second (planar) region 32 which is defined in the outer area 33 of the end plate. Referring back to FIG. 3A, the first and second planar regions 26, 32 may be substantially parallel to the outer surface 22 of the end plate unit 10, 12.

As shown in FIG. 3A, it is understood that the current collector 20, having a top surface 45, is disposed on the first region 26 as shown. Also as shown in phantom in FIG. 3A, it is understood that where the current collector and the first region are recessed relative to the second region, the current collector may alternatively have a contoured top surface 45' (shown in phantom) and substantially concave (or chamfered to follow a substantially concave face) to allow for a gradual transition from the seal area 35 to the current collector 20.

Similar to the first embodiment, the first (planar) region 26 in the second embodiment may be spaced apart from the outer surface 22 at a first thickness 41' as shown in FIG. 3A.

The first thickness 41' may, but not necessarily fall in the range of about 8.0 mm to 25.0 mm. It is understood that a current collector having a second thickness 43' may be disposed on the first region 26. Accordingly, the top surface 45 of the current collector 20 when disposed on the first region 26 may be spaced apart from the outer surface at a first predetermined distance 40'. The second (planar) region 32 is spaced apart from the outer surface 22 at a second predetermined distance 42'. In FIG. 3A, first predetermined distance 40' is less than the second predetermined distance 42'. Again, the height difference (H) 47' is defined as the difference in height between the first predetermined distance 40 and the second predetermined distance 42'. Therefore, in comparing FIGS. 2A and 3A, it is understood that height difference H 47' of an end plate unit 10 of the present disclosure may vary depending on the specific end plate unit used—given that the first predetermined distance and the second predetermined distance may each vary resulting in a different height difference H 47' for each plate 12 in a set 90 of end plate units (shown in FIGS. 7A and 7B). Therefore, as shown in FIG. 3A, height difference 47' defines the distance upon which first region 26 and current collector 20 is recessed relative to the second region 32.

Accordingly, the end plate unit 10, 12 shown in FIG. 3A may provide some margin in the active area region upon assembly when it has been determined that the seal forces 37 between the plurality of fuel cells and base end plate are too low and such seal forces 37 need to be increased upon final assembly in order to provide a robust contact between the various elements in the seal region of the fuel cell stack. It is understood that final assembly occurs when the second embodiment end plate unit 10, 12 is added and the fuel cell stack is compressed.

Figure 4A:
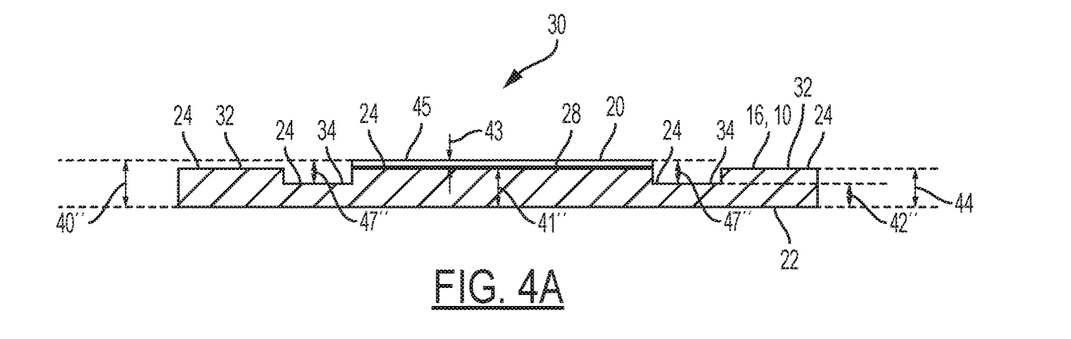
FIG. 4A is a schematic cross sectional view of the end plate unit in FIG. 4B along lines 4A-4A.
Figure 4B:
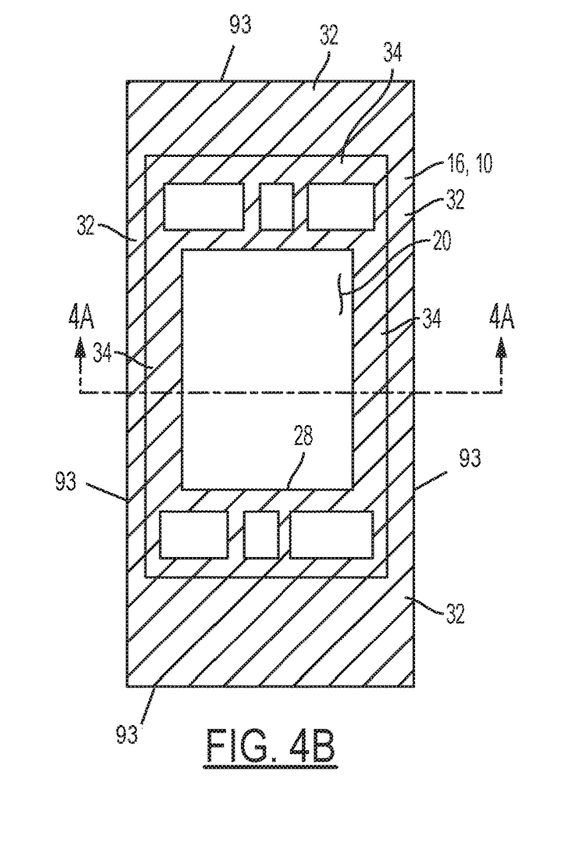
FIG. 4B is a schematic top view of a third embodiment end plate unit of the present disclosure.

Referring now to FIGS. 4A and 4B and in accordance with a third embodiment, another non-limiting example end plate unit 10, 16 for a fuel cell stack is shown where the inner surface defines three regions in order to redistribute the compression load across a fuel cell stack. FIG. 4B is a top schematic view which may represent a third embodiment while FIG. 4A illustrates the cross section of the end plate unit 10, 16 in FIG. 43 along lines 4-4.

As shown in FIG. 4A, the end plate unit 10, 16 includes an outer surface 22, an inner surface 24 and a current collector 20. Again, current collector 20 may, but not necessarily have a thickness of 2.0 mm to 8.0 mm. The current collector 20 has a second thickness 43 and as shown, the current collector 20 may be disposed on the center region 28. The inner surface 24 may define different regions where there is at least a seal (planar) region 34, a center planar region 28 spaced apart from and substantially parallel to the seal (planar) region 34, and a second (planar) region 32 spaced apart from and substantially parallel to the seal (planar) region 34. It is understood that the inner surface 24 is disposed opposite the outer surface 22 as shown. The current collector 20 is provided on the end plate unit 10, 16 so that the current collector 20 may collect current from a plurality of fuel cells when the end plate unit 10 is assembled onto a fuel cell stack.

As shown in FIGS. 4A and 4B, the center (planar) region 28 may be defined in the center area 30 of the inner surface 24 while the second (planar) region 32 may be defined proximate to the peripheral edge 93 (or in the outer area 33) of the inner surface 24 of the end plate unit 10, 16. It is understood that a current collector 20 may be affixed to the center region 28. Moreover, as shown in FIGS. 4A and 4B, the seal region 34 is defined on yet another (third) surface of the inner surface and the seal region is disposed between the second and third planar regions.

As shown in FIG. 4A, the seal (planar) region 34 is spaced apart from the outer surface 22 at a second predetermined distance 42" while the center (planar) region 28 is spaced apart from the outer surface 22 at a first thickness 41". The top surface 45 of the current collector 20 is spaced apart from the outer surface 22 at a first predetermine distance 40". It is understood that the first predetermined distance 40" is generally equal to the sum of the current collector thickness (second thickness) 43 and the first thickness 41" for all embodiments in the present disclosure.

Referring again the third embodiment shown in FIG. 4A, the second (planar) region 32 is also spaced apart from the outer surface 22 at a third predetermined distance 44. The height difference (H") 47" in the third embodiment is defined as the difference in height between the first predetermined distance 40" and the second predetermine distance 42". In the third embodiment, it is understood that the height difference H" 47" may vary depending on the specific end plate unit selected out of a set of units having various dimensions. Again, a set of end plate units may be provided in order to provide adequate options to an assembler or a system to resolve a load distribution issue—based on measurements taken during the fuel cell assembly process. Therefore, in the example of FIG. 4A, the height difference H" 47" defines the distance upon which the top surface of the current collector (which engages with the active area region) protrudes outward relative to the seal region (which engages with the seal regions of the fuel cell stack).

As shown in FIG. 4A, the second predetermined distance 42" may be less than each of the first predetermined distance 40" and the third predetermined distance 44 such that the seal (planar) region 34 may be recessed (as shown in FIG. 4A) relative to the rest of the inner surface 24 and current collector. This configuration is useful in that, when this third embodiment end plate unit 10, 16 is assembled and compressed onto the fuel cell stack 80 (as shown in FIG. 7B), a lower compression load 39 may be applied to the seal regions 92 of the fuel stack relative to the active areas (center region) 94 of the fuel cell stack 80. Therefore, the third embodiment fuel cell end unit is useful when the seal forces 37 are above normal or too high (relative to active area region), and a lower load 39 must be applied across seal regions 92 (shown in FIG. 78) of the fuel cell stack to ensure proper height between the various active areas and proper seal contact. As shown, it is also understood that the first thickness 41" and/or the first predetermined distance 40" may be substantially equal to the third predetermined distance 44.

Figure 5A:
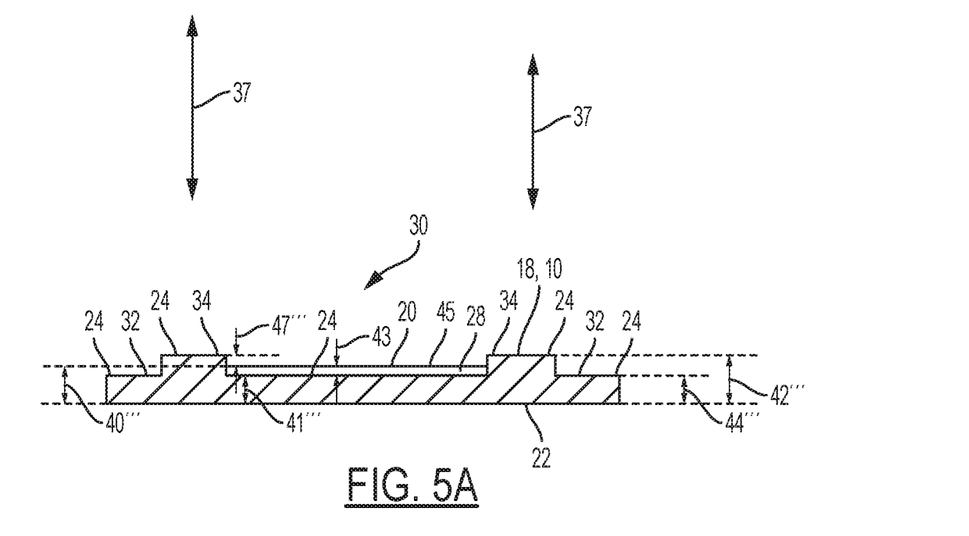
FIG. 5A is a schematic cross sectional view of the end plate unit in FIG. 5B along lines 5A-5A.
Figure 5B:
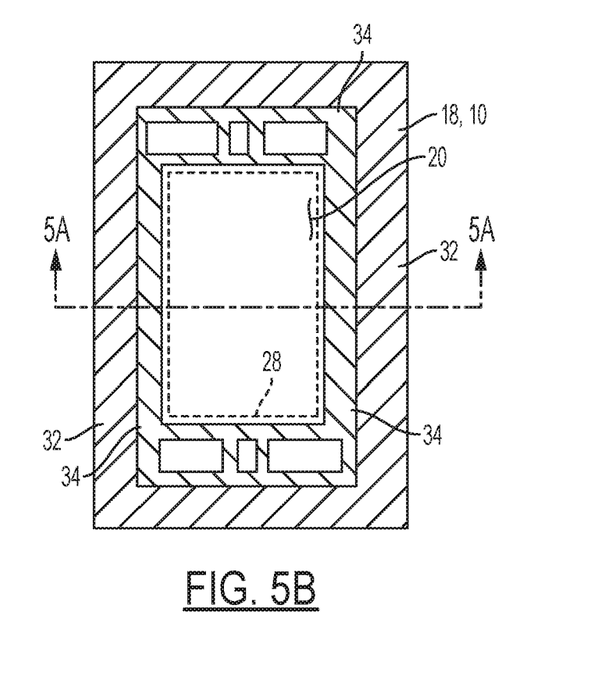
FIG. 5B is a schematic top view of a fourth embodiment end plate unit of the present disclosure.

Referring now to FIGS. 5A and 5B, a fourth embodiment fuel cell end plate unit 10, 18 for a fuel cell stack is shown. FIG. 5B is a top schematic view which may represent a fourth embodiment fuel cell end unit while FIG. 5A illustrates the cross section of the end plate unit 10, 18 in FIG. 5B along lines 5-5. As shown in FIG. 5A, the end plate unit 10, 18 includes an outer surface 22, an inner surface 24 and a current collector 20. The inner surface 24 may be formed from different parts where there is at least a seal (planar) region 34, a center (planar) region 28 spaced apart from and substantially parallel to the seal (planar) region 34, and a second (planar) region 32 spaced apart from and substantially parallel to the seal (planar) region 34. It is understood that the inner surface 24 is disposed opposite the outer surface 22 as shown. It is also understood that the current collector 20 may, but not necessarily, be affixed to the center (planar) region 28. The current collector 20 is provided on the end plate unit 10, 18 so that the current collector 20 may collect current from a plurality of fuel cells. Again, the current collector 20 may, but not necessarily have a thickness of 2.0 mm to 8.0 mm.

As shown in FIGS. 5A and 5B, the center (planar) region 28 may be defined in the center area 30 of the end plate and the outer (planar) region is defined in the outer area 33 of the end plate. It is understood that a current collector 20 may be affixed to the first planar region. Moreover, the center (planar) region 28 may be defined in the center area 30 of the inner surface 24 while the second (planar) region 32 may be defined proximate to the peripheral edge of the inner surface 24 of the end plate unit 10, 18. Moreover, as shown in FIGS. 5A and 5B, the seal (planar) region 34 is defined on yet another (third) surface disposed between the second and third planar regions.

As shown in FIG. 5A, the seal (planar) region 34 is spaced apart from the outer surface 22 at a second predetermined distance 42''' while the center (planar) region 28 is spaced apart from the outer surface 22 at a first thickness 41'''. The top surface 45 of the current collector 20 is spaced apart from the outer surface 22 at a first predetermine distance 40'''. The second (planar) region 32 is also spaced apart from the outer surface 22 at a third predetermined distance 44'. As shown in FIG. 5A, the second predetermined distance 42''' may be greater than the first predetermined distance 40''' as shown in FIG. 5A. It is also understood that the first thickness and/or the first predetermined distance 40''' may be substantially equal to the third predetermined distance 44'. Therefore, under the various aforementioned arrangements, the center region 28 (with the current collector 20) may be recessed relative to the seal regions 34. Similar to the previous embodiments, it is understood that the current collector may vary in thickness from about 2.0 mm to 8.0 mm.

The height difference (H''') 47''' in the fourth embodiment is defined as the difference in height between the first predetermined distance 40" and the second predetermine distance 42'''. In the third and fourth embodiments, it is understood that the height difference H" 47' and H''' 47''' may vary from 0.50 mm to 6.00 mm depending on the specific end plate unit selected out of a set of end plate units having various dimensions. Again, a set of end plate units may be provided in order to provide adequate options to an assembler or a system to resolve a load distribution issue—based on measurements taken during the fuel cell assembly process. Therefore, in the example of FIG. 5A, the height difference H''' 47''' defines the distance upon which the top surface of the current collector (which engages with the active area region) is recessed relative to the seal region 34 (which engages with the seal regions of the fuel cell stack).

Accordingly, the seal (planar) region 34 protrudes relative to current collector 20 and center region 28 by distance H 47'''—such that when this fourth embodiment end plate unit 10, 18 is assembled and compressed onto the fuel cell stack, a higher compression load 39 may be applied to the seal regions of the fuel stack relative to the compression load 39 that is applied to the active areas of the fuel cell stack due to the height difference H" shown in FIG. 5A. The fourth embodiment fuel cell end unit is useful when the seal forces 37 are below normal or too low (relative to active area region), and a higher load must be applied across seal regions of the fuel cell stack to ensure proper contact.

Figure 6:
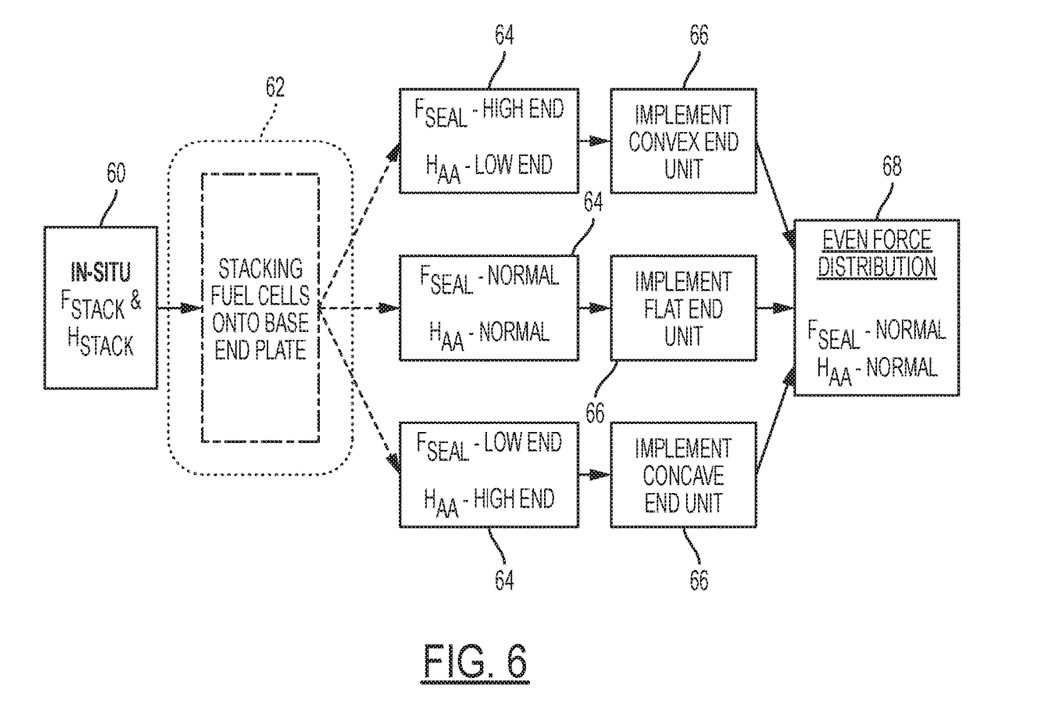
FIG. 6 is a flow chart which illustrates a manufacturing method for a fuel cell stack in accordance with various embodiments of the present disclosure.

With reference now to FIG. 6, an example flow chart for a method to manufacture a fuel cell stack using the end plate unit of the present disclosure is shown. The example method for manufacturing a fuel cell stack assembly includes the steps of: (1) providing a first end unit which has a flat or substantially flat inner surface 60; (2) assembling a plurality of fuel cells on top of the first end unit 62; (3) measuring a seal force/active area force across the first end unit and the plurality of fuel cells or an average active area height for each fuel cell in the plurality of fuel cells 64; (4) providing a second contoured end plate unit(s) from a set of contoured end plate units based upon the seal force/active area force or the average active area height; or replacing the first end unit with a contoured third end unit and providing a second contoured end plate unit(s) from a set of contoured end plate units based upon the seal force/active area force or the average active area height 66; and (5) compressing the plurality of fuel cells, the second contoured end plate unit together with one of the first end unit or the third end unit via a plurality of mechanical fasteners 68. It is understood that the third contoured end unit may also come from a set of contoured end plate units based upon the measured forces and heights.

It is understood that, in one example, each contoured end plate unit 10 in the set 90 of contoured end plate units may define a first planar region and a second planar region. The selected end plate unit from the set 90 will provide the desired load distribution to the fuel cell stack based on the unique seal force or AA force measurement or active area height for a particular fuel cell stack. It is understood that the difference height difference 47, 47' between the first predetermined distance 40, 40' and the second predetermined distance 42, 42' may increase or decrease from plate to plate within a set so that the set of end plate units may be implemented to address a variety of conditions which may occur in assembly.

As indicated, the first planar region and current collector together may be spaced apart from the outer surface 22 at a first predetermined distance 40, 40' and the second planar region is spaced apart from the outer surface 22 at a second predetermined distance 42, 42'. It is understood that the first and the second predetermined distances may not be equal to one another. Accordingly, the first planar region (together with the current collector 20) may be recessed relative to the second planar region where the first predetermined distance is less than second predetermined distance. Alternatively, with this set of end plate units, the first planar region (together with the current collector 20) may protrude relative to the second planar region where the predetermined distance is greater than the second predetermined distance. Accordingly, the end plate units implemented under this method may provide some margin in the seal area 35 upon assembly when it has been determined that the seal forces 37 between the plurality of fuel cells and base end plate are too high and such seal forces 37 need to be decreased upon final assembly—when the end plate unit is added and the fuel cell stack is compressed. Alternatively, the end plate units implemented under this method may also provide increased seal forces 37 across the seal areas 35 of the fuel cell stack upon assembly when it has been determined that the seal forces between the plurality of fuel cells and base end plate are too low and such seal forces need to be increased upon final assembly (relative to forces/loads which may be applied across the active area regions of the fuel cell stack). Under his condition, the first predetermined distance would be less than the second predetermined distance as stated above.

Alternatively, the method of manufacture of the present disclosure may implement a different set of contoured end plate units where three regions may be defined on the inner surface 24. That is, each contoured end plate unit in the set of contoured end plate units may define a seal (planar)

region 34, a center (planar) region 28 spaced apart from and substantially parallel to the seal (planar) region 34, and a second (planar) region 32 spaced apart from and substantially parallel to the seal (planar) region 34. In this set of contoured end plate units, the first planar region may be defined in the center area 30 of the end plate and the second planar region is defined in the outer area 33 of the end plate. It is understood that a current collector 20 may be affixed to the first planar region. Moreover, the center (planar) region 28 may be defined in the center area 30 of the inner surface 24 while the second (planar) region 32 may be defined proximate to the peripheral edge of the inner surface 24 of the end plate unit. Moreover, the seal (planar) region 34 is defined on yet another (third) surface disposed between the second and third planar regions.

The seal (planar) region 34 is spaced apart from the outer surface 22 at a second predetermined distance 42", 42'" while the center (planar) region 28 together with current collector 20 may be spaced apart from the outer surface 22 at a first predetermined distance 40", 40'". The second (planar) region 32 is also spaced apart from the outer surface 22 at a third predetermined distance 44, 44'. The first predetermined distance 40" may be greater than the second predetermined distance 42" such that the seal (planar) region 34 may be recessed relative to the rest of the inner surface 24. This results in a lower compression load 39 applied to the seal regions of the fuel stack relative to the active areas when the end plate unit 16 is assembled. Under this scenario, the seal forces 37 (just prior to assembling the end plate unit shown in FIG. 7B) are above normal or too high relative to active area region. Thus, a higher load must be applied across seal regions of the fuel cell relative to the load across the active areas to ensure an even load distribution through the fuel cell stack.

In contrast, when the second predetermined distance 42'" is greater than the first predetermined distance 40'", the seal (planar) region 34 may protrude outward relative to the current collector 20 and center region 28. Accordingly, when the fuel cell end plate 18 is assembled onto a fuel stack a higher compression load 39 may be applied to the seal regions of the fuel stack relative to the active areas of the fuel cell stack when needed. That is, such a configuration is needed when, the seal forces 37 are below normal or too low (relative to active area region), and a higher load must be applied across seal regions 92 of the fuel cell stack 80 to ensure proper contact and even load distribution.

Figure 7A:
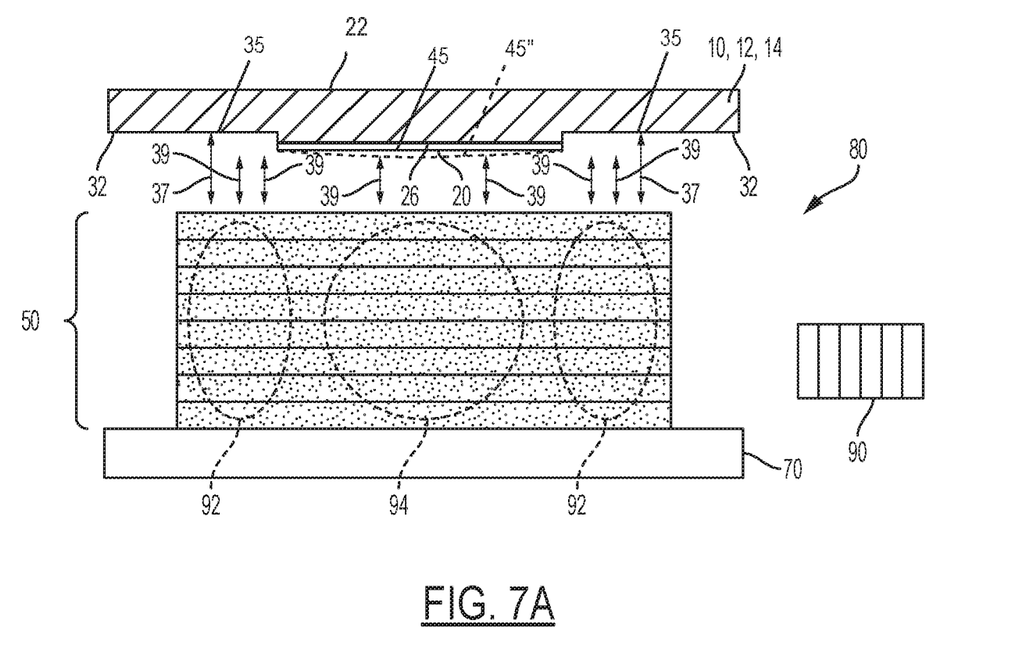
FIG. 7A illustrates a side view of a first non-limiting example fuel cell stack in accordance with various embodiments of the present disclosure.
Figure 7B:
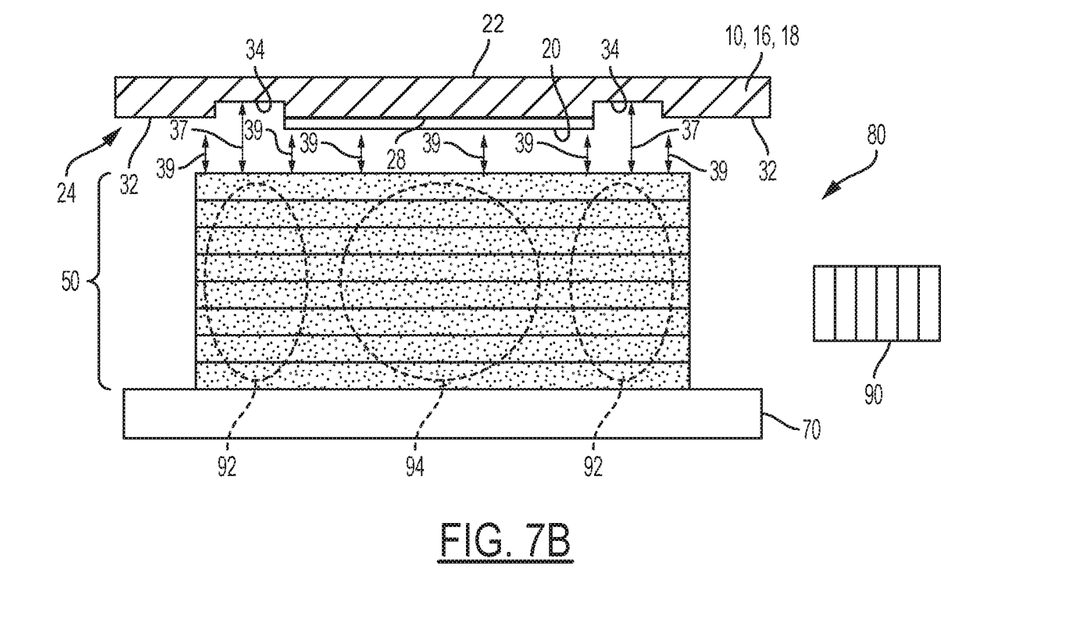
FIG. 7B illustrates a side view of a second, non-limiting, example fuel cell stack in accordance with various embodiments of the present disclosure.

Referring now to FIGS. 7A and 7B, two example fuel cell stacks are shown in accordance to various embodiments of the present disclosure. In FIG. 7A, the fuel cell stack includes a base or first end plate unit 70 which may be flat or contoured; a plurality of fuel cells and a second contoured end plate unit 10 having a first (planar) region 26 and a second (planar) region 32 as described above. The current collector 20 having a top surface 45 is disposed on the first region 26. As shown in phantom in FIG. 7A, it is understood that where the current collector and the first region protrude beyond the second region, the current collector may alternatively have a contoured top surface 45" (shown in phantom) and substantially convex (or chamfered to follow a substantially convex shape) to allow for a gradual transition from the seal area 35 to the current collector 20.

In FIG. 7B, another example fuel stack 80 is shown which includes a base end plate unit 70 which may be flat or contoured; a plurality of fuel cells 50 and a contoured end plate unit 10 having an inner surface 24 with at least a seal (planar) region 34, a center (planar) region 28 spaced apart from and substantially parallel to the seal (planar) region 34, and a second (planar) region 32 spaced apart from and substantially parallel to the seal (planar) region 34. The current collector 20 having a top surface 45 is disposed on the center region 28. These areas of the inner surface 24 may form various configurations in order to evenly distribute the compression load 39 across the fuel cell stack as previously described.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An end plate for a fuel cell stack, the end plate consisting of:
  a plate external to a plurality of fuel cells in the fuel cell stack, the plate having:
    an outer surface facing away from the fuel cell stack; and an inner surface having a first region and a second region, the second region is spaced apart from and substantially parallel to the first region, the first region protrudes away from the second region a fixed distance in a direction normal to and away from the outer surface, and the inner surface is disposed opposite the outer surface; and
  a current collector configured to electrically connect directly to the fuel cell stack, external to the plurality of fuel cells in the fuel cell stack, is directly affixed to and covering the first region of the inner surface of the plate, and is confined to the first region of the inner surface of the plate.

2. The end plate as defined in claim 1 wherein the first region is defined in a center area of the end plate and the second region is defined in an outer area of the end plate and surrounds the first region.

3. The end plate as defined in claim 1 wherein the first region and the second region reside in different planes substantially parallel to the outer surface.

4. The end plate as defined in claim 2 wherein a top surface of the current collector is opposite the inner surface and spaced apart from the outer surface at a first fixed distance, the second region is spaced apart from the outer surface at a second fixed distance, and the first fixed distance is different than the second fixed distance.

5. The end plate as defined in claim 4 wherein the first fixed distance is greater than the second fixed distance.

6. The end plate as defined in claim 1 wherein the current collector is further configured to collect current from the plurality of fuel cells of the fuel cell stack.

7. The end plate as defined in claim 4 wherein the top surface of the current collector is contoured to one of a substantially convex shape or a substantially concave shape.

8. An end plate for a fuel cell stack, the end plate consisting of:
  a plate external to a plurality of fuel cells in the fuel cell stack, the plate having:
    an outer surface facing away from the fuel cell stack; and an inner surface having at least a seal region, a center region spaced apart from and substantially parallel to the seal region, an outer region spaced apart from and substantially parallel to the seal region, the center region protrudes away from the seal region a first fixed distance in a direction normal to and away from the outer surface, the outer region protrudes away from the seal region a second fixed distance in the direction normal to and away from the outer surface, and the inner surface is disposed opposite the outer surface; and a current collector configured to electrically connect directly to the fuel cell stack, external to the plurality of fuel cells in the fuel cell stack, is directly affixed to and covering the center region of the inner surface of the plate, and is confined to the center region of the inner surface of the plate.

9. The end plate as defined in claim 8 wherein the center region is defined in a center area of the inner surface, the outer region is defined proximate to a peripheral edge of the inner surface, and the seal region is defined between the center region and the outer region.

10. The end plate as defined in claim 9 wherein a top surface of the current collector is opposite the inner surface and spaced apart from the outer surface at a third fixed distance, the seal region is spaced apart from the outer surface at a fourth fixed distance, the outer region is spaced apart from the outer surface at a fifth fixed distance, and the third fixed distance is different than the fourth fixed distance.

11. The end plate as defined in claim 10 wherein the first third fixed distance is greater than the fourth fixed distance.

12. The end plate as defined in claim 11 wherein the first third fixed distance is equal to the fifth fixed distance.

13. A method for manufacturing a fuel cell stack, the method comprising the steps of:

providing a first end unit;

assembling a plurality of fuel cells on top of the first end unit;

measuring a seal force across the first end unit and the plurality of fuel cells and an average active area height for each fuel cell in the plurality of fuel cells;

providing a second contoured end plate unit from a set of contoured end plate units based upon the seal force and the average active area height, the second contoured end plate unit consisting of:

a plate external to the plurality of fuel cells in the fuel cell stack, the plate having: an outer surface facing away from the plurality of fuel cells; and an inner surface having a first region and a second region the second region is spaced apart from and substantially parallel to the first region, the first region protrudes away from the second region a fixed distance in a direction normal to and away from the outer surface, and the inner surface is disposed opposite the outer surface; and a current collector configured to electrically connect directly to the plurality of fuel cells, external to the plurality of fuel cells, is directly affixed to and covering the first region of the inner surface of the plate, and is confined to the first region of the inner surface of the plate; and compressing the first end unit, the plurality of fuel cells and the second contoured end plate together via a plurality of mechanical fasteners.

14. The method for manufacturing the fuel cell stack as defined in claim 13 wherein each contoured end plate unit in the set of contoured end plate units defines the first region having a different fixed thickness relative to the second region.

15. The method for manufacturing the fuel cell stack as defined in claim 13 wherein each contoured end plate unit in the set of contoured end plate units defines a seal planar region, a center planar region spaced apart from and substantially parallel to the seal planar region, and an outer planar region spaced apart from and substantially parallel to the seal planar region.

16. The end plate as defined in claim 1 wherein the second region includes a plurality of ports located on opposite sides of the first region.

* * * * *